(12) United States Patent
Kurosawa

(10) Patent No.: US 7,934,878 B2
(45) Date of Patent: May 3, 2011

(54) DIAPHRAGM DRIVING DEVICE OF A CAMERA SYSTEM USING AN INTERCHANGEABLE LENS

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 42 days.

(21) Appl. No.: 12/423,945

(22) Filed: Apr. 15, 2009

(65) Prior Publication Data

US 2009/0263120 A1    Oct. 22, 2009

(30) Foreign Application Priority Data

Apr. 17, 2008   (JP) ................................. 2008-107500

(51) Int. Cl.
 *G03B 9/02* (2006.01)
(52) U.S. Cl. ....................................................... 396/505
(58) Field of Classification Search .................. 396/260, 396/505, 508
See application file for complete search history.

(56) References Cited

U.S. PATENT DOCUMENTS

| | | | | | |
|---|---|---|---|---|---|
| 3,744,393 | A | * | 7/1973 | Uchiyama et al. ............ | 396/508 |
| 4,772,909 | A | * | 9/1988 | Ogasawara .................... | 396/136 |
| 5,109,250 | A | * | 4/1992 | Shinozaki et al. ............ | 396/244 |
| 6,040,642 | A | | 3/2000 | Ishiyama | |
| 6,211,642 | B1 | * | 4/2001 | Holdaway ..................... | 318/696 |
| 6,616,446 | B1 | * | 9/2003 | Schmid ........................... | 433/27 |
| 6,628,098 | B2 | * | 9/2003 | Kaufhold et al. ............. | 318/696 |
| 6,640,056 | B2 | * | 10/2003 | Konishi et al. ................ | 396/259 |
| 2002/0114623 | A1 | | 8/2002 | Uenaka | |
| 2007/0177046 | A1 | * | 8/2007 | Makii ............................. | 348/335 |
| 2008/0170845 | A1 | | 7/2008 | Kurosawa | |
| 2008/0199176 | A1 | | 8/2008 | Kurosawa | |
| 2008/0226280 | A1 | | 9/2008 | Numako et al. | |
| 2008/0253004 | A1 | | 10/2008 | Hamasaki | |

FOREIGN PATENT DOCUMENTS

| | | |
|---|---|---|
| JP | 5-280920 | 10/1993 |
| JP | 10-313566 | 11/1998 |
| JP | 2002-290828 | 10/2002 |
| JP | 2007-282475 | 10/2007 |

OTHER PUBLICATIONS

English language Abstract of JP 10-313566, Nov. 24, 1998.
English language Abstract of JP 2002-290828, Oct. 4, 2002.
English language Abstract of JP 2007-282475, Oct. 25, 2007.
English language Abstract of JP 5-280920, Oct. 29, 1993.
U.S. Appl. No. 12/028,972 to Kurosawa, which was filed Feb. 11, 2008.

* cited by examiner

*Primary Examiner* — W. B. Perkey
*Assistant Examiner* — Leon W Rhodes
(74) *Attorney, Agent, or Firm* — Greenblum & Bernstein P.L.C.

(57) ABSTRACT

A diaphragm driving device for a camera including a camera body and an interchangeable lens which is detachably attached to the camera body, wherein the interchangeable lens includes a diaphragm mechanism having an in-lens spring device for performing a stop-down operation, the in-lens-spring device having a spring constant. The camera body includes a diaphragm drive mechanism having a diaphragm drive motor and an in-body spring device, both of which are for making the diaphragm mechanism of the interchangeable lens perform the stop-down operation, and
a controller for controlling a driving current which is supplied to the diaphragm drive motor in accordance with the spring constant of the in-lens spring device.

11 Claims, 10 Drawing Sheets

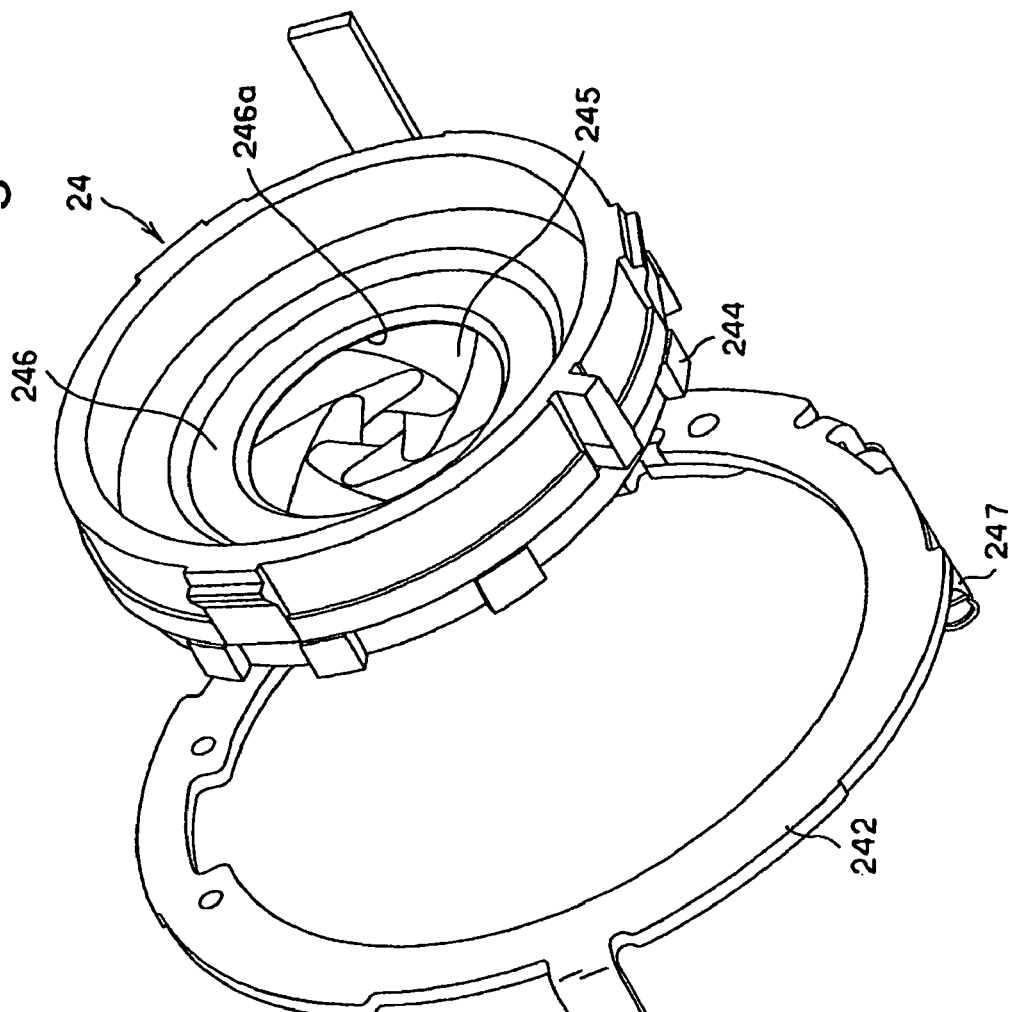
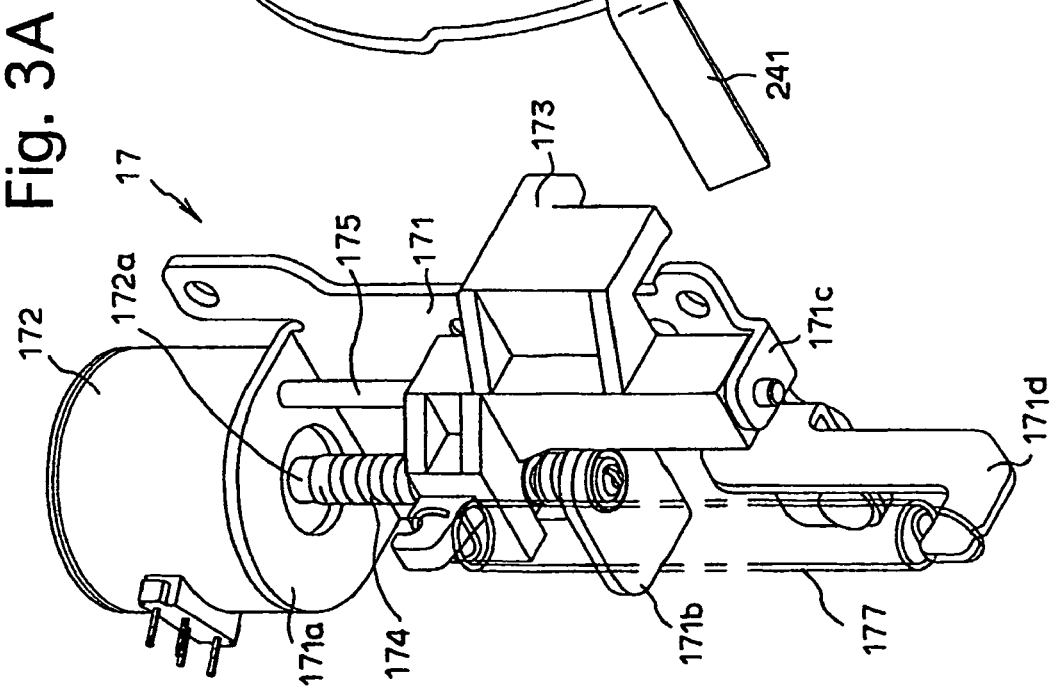

DIAPHRAGM DRIVING DEVICE OF A CAMERA SYSTEM USING AN INTERCHANGEABLE LENS

BACKGROUND OF THE INVENTION

1. Field of the Invention

The present invention relates to a camera system such as an SLR camera system which includes a camera body and an interchangeable lens that is detachably attached to the camera body, and in particular relates to a diaphragm driving device of the camera system which is configured so that the operation of an adjustable diaphragm of the interchangeable lens is controlled by the camera body.

2. Description of the Prior Art

In conventional camera systems using an interchangeable photographic lens (hereinafter referred to as an interchangeable lens), especially in SLR camera systems, upon taking a picture, the main mirror (quick-return mirror) is raised so that it retracts from a photographing optical path while a diaphragm drive mechanism in the camera body is actuated to stop down a diaphragm (iris diaphragm) to the position of a preset F-number from a full-aperture state, and thereupon, the shutter (focal-plane shutter) is released. For instance, the camera body is provided with a diaphragm-driving slide plate while the interchangeable lens is provided with a diaphragm control bar which engages with the diaphragm-driving slide plate when the interchangeable lens is mounted to the camera body, wherein the diaphragm-driving slide plate moves in association with the upward retracting movement of the main mirror that is caused by the mirror drive mechanism, the diaphragm control bar operates to make the diaphragm in the interchangeable lens perform a stop-down operation, and the diaphragm-driving slide plate is slidingly moved by an amount of movement (stroke) corresponding to a preset exposure (F-number) concurrently with the aforementioned upward retracting movement of the main mirror to thereby move the diaphragm control bar to stop down the diaphragm of the interchangeable lens. In the interchangeable lens, the diaphragm control bar is continuously biased in a direction to stop down the diaphragm by a control-bar restoring spring (extension spring) provided in the interchangeable lens, and the diaphragm control bar is forced to move to a full-aperture position against the biasing force of the control-bar restoring spring via the engagement of the diaphragm control bar with the diaphragm-driving slide plate when the interchangeable lens is mounted to the camera body. Upon taking a picture, a movement of the diaphragm-driving slide plate causes the diaphragm control bar to move in a direction to stop down the diaphragm by utilizing the biasing force of the control-bar restoring spring. Additionally, a new type of diaphragm driving device which drives a diaphragm drive motor installed in a camera body and transfers the rotational driving force of the diaphragm drive motor to the interchangeable lens to drive the diaphragm in the interchangeable lens has been proposed in recent years as shown in Japanese Unexamined Patent Publication No. 2002-290828.

The diaphragm driving device shown in JUPP 2002-290828 is required to be equipped with a mechanism for coupling a diaphragm drive motor installed in the camera body to a stop-down mechanism installed in the interchangeable lens, and therefore cannot be applied to an interchangeable lens equipped with a conventional diaphragm control bar, thus having a problem with general versatility. On the other hand, the diaphragm driving device which stops down the diaphragm of the interchangeable lens by a conventional diaphragm-driving slide plate excels in general versatility with interchangeable lenses, but there is a problem with the power consumption for driving the diaphragm drive motor increasing since the diaphragm-driving slide plate, provided in the camera body for driving the diaphragm control bar installed in the interchangeable lens, is driven by a rotational force of the diaphragm drive motor (stepping motor). Namely, in conventional interchangeable lenses, since the spring constant (spring force) of the control-bar restoring spring that is associated with the diaphragm control bar differs according to the type of interchangeable lens, the driving current for the diaphragm drive motor (stepping motor), that serves as a drive source for the diaphragm-driving slide plate, is determined so that the diaphragm drive motor (stepping motor) can drive an interchangeable lens in which the spring force of the control-bar restoring spring is set to a minimum. Due to this setting, the driving force of the diaphragm drive motor (stepping motor) needs to be increased as the spring force of the control-bar restoring spring is reduced since a combination of the spring force of the control-bar restoring spring and the driving force of the diaphragm drive motor (stepping motor) drives the diaphragm-driving slide plate while resiliently deforming (extending) the control-bar restoring spring in the camera body against the biasing force thereof. Conversely, if the spring force of the control-bar restoring spring is great, the driving force of the diaphragm drive motor (stepping motor) can be reduced. However, in conventional diaphragm driving devices, the driving force of the diaphragm drive motor (stepping motor) must be set relatively large on the assumption that an interchangeable lens with a control-bar restoring spring whose spring force is small may be mounted to the camera body. Therefore, if the spring force of the control-bar restoring spring is great, the electrical power which is supplied to the stepping motor becomes greater than necessary, which results in an unnecessary increase in power consumption.

SUMMARY OF THE INVENTION

The present invention provides a low-power consumption diaphragm driving device of a camera system using a conventional interchangeable lens equipped with a diaphragm control bar.

According to an aspect of the present invention, a diaphragm driving device for a camera including a camera body and an interchangeable lens which is detachably attached to the camera body is provided, wherein the interchangeable lens includes a diaphragm mechanism having an in-lens spring device for performing a stop-down operation, the in-lens-spring device having a spring constant. The camera body includes a diaphragm drive mechanism having a diaphragm drive motor and an in-body spring device, both of which are for making the diaphragm mechanism of the interchangeable lens perform the stop-down operation, and a controller for controlling a driving current which is supplied to the diaphragm drive motor in accordance with the spring constant of the in-lens spring device.

When performing one of the stop-down operation and a diaphragm opening operation, it is desirable for a spring force of the in-lens spring device and a torque of the diaphragm drive motor to act on the diaphragm drive mechanism in a same direction while a spring force of the in-body spring device acts on the diaphragm drive mechanism in a direction opposite to the same direction.

It is desirable for the same direction to be a stop-down direction, the in-lens spring device and the diaphragm drive motor operating in the stop-down direction to make the diaphragm mechanism of the interchangeable lens perform the stop-down operation, while the in-body spring device operates in a direction opposite to the stop-down direction.

It is desirable for the controller to control the driving current to increase the driving current when the spring constant of the in-lens spring device is small.

It is desirable for the diaphragm mechanism of the interchangeable lens to include a diaphragm control bar for changing an aperture size by a movement of the diaphragm control bar, wherein the diaphragm driving device provided in the camera body includes a diaphragm-driving slide plate which engages with the diaphragm control bar when the interchangeable lens is attached to the camera body. The in-lens spring device includes a control-bar restoring spring which moves the diaphragm control bar in the stop-down direction to make the diaphragm mechanism of the interchangeable lens perform the stop-down operation. The diaphragm drive motor drives the diaphragm-driving slide plate in the stop-down direction so as to move the diaphragm control bar in the stop-down direction thereof. The in-body spring device includes a diaphragm-driving slide plate restoring spring which biases the diaphragm-driving slide plate in a direction to increase the aperture size to a maximum.

It is desirable for the interchangeable lens to include a memory in which data on the spring constant of the in-lens spring device is stored, and for the controller to read the data on the spring constant of the in-lens spring device from the memory to control the driving current.

It is desirable for the diaphragm driving device to include a rotation sensor for sensing rotation of the diaphragm drive motor when stop-down operation is performed, and for the controller to operate to continue incrementing a level of the driving current from a minimum level based on an output from the rotation sensor until the level of the driving current reaches a level enabling the diaphragm drive motor to rotate.

The diaphragm drive motor can be a stepping motor, and it is desirable for the controller to control the frequency and duty ratio of a pulse signal supplied to the diaphragm drive motor.

It is desirable for the diaphragm driving device to include a diaphragm ring positioned coaxially around an optical axis of the interchangeable lens to be rotatable about the optical axis, the diaphragm control bar being integrally formed with the diaphragm ring.

It is desirable for a spring force of the in-body spring device to be greater than a spring force of the in-lens spring device so that the in-body spring device can move the diaphragm-driving slide plate against a detent torque of the diaphragm drive motor.

In an embodiment, a diaphragm driving device is provided in a camera body to which an interchangeable lens is detachably attached, wherein the interchangeable lens includes a diaphragm mechanism having a diaphragm control bar for changing an aperture size by a movement of the diaphragm control bar, and a in-lens spring device for biasing the diaphragm control bar in a stop-down direction to make the diaphragm mechanism perform a stop-down operation, the in-lens spring device having a spring constant. The camera body includes a diaphragm-driving slide plate which engages with the diaphragm control bar when the interchangeable lens is attached to the camera body, a diaphragm drive motor for moving the diaphragm-driving slide plate in accordance with object brightness information of an object image formed through the interchangeable lens; a in-body spring device for biasing the diaphragm-driving slide plate in a direction to increase the aperture size to a maximum, and a controller for controlling a driving current which is supplied to the diaphragm drive motor in accordance with the spring constant of the in-lens spring device.

In an embodiment, an interchangeable lens is provided, which is detachably attached to a camera body, including a diaphragm mechanism for changing an aperture size of the lens, a in-lens spring device for biasing the diaphragm mechanism in a stop-down direction, the in-lens spring device having a spring constant, and a memory which stores the spring constant of the in-lens spring device.

According to the present invention, by controlling the torque of the diaphragm drive motor in accordance with the spring force of the in-lens spring device when the operation of the diaphragm mechanism is controlled in the interchangeable lens, the driving current for the diaphragm drive motor can be controlled in order to compensate for a different spring force of the in-lens spring device that differs depending on the type of interchangeable lens, which makes it possible to achieve a reduction in power consumption of the diaphragm drive motor by reducing the driving current therefor. Specifically, by making the spring force of the in-lens spring device and the torque of the diaphragm drive motor act in the same direction, the power consumption of the diaphragm drive motor is reduced by reducing the driving current for the diaphragm drive motor when the spring force of the in-lens spring device is great. For instance, by configuring the diaphragm driving device so that the in-lens spring device and the diaphragm drive motor operate in a direction to stop down the diaphragm, the torque of the diaphragm drive motor can be reduced during the stopping-down operation when the spring force of the in-lens spring device is great, which makes it possible to achieve a reduction in power consumption of the diaphragm drive motor.

The present disclosure relates to subject matter contained in Japanese Patent Application No. 2008-107500 (filed on Apr. 17, 2008) which is expressly incorporated herein in its entirety.

BRIEF DESCRIPTION OF THE DRAWINGS

The present invention will be discussed below in detail with reference to the accompanying drawings, in which:

FIG. 3A is a perspective view of the diaphragm drive mechanism of the camera body shown in FIG. 1A;

FIG. 3B is an exploded perspective view of a diaphragm mechanism provided in the interchangeable lens shown in FIG. 1B;

DESCRIPTION OF THE PREFERRED EMBODIMENTS

Figure 1A:
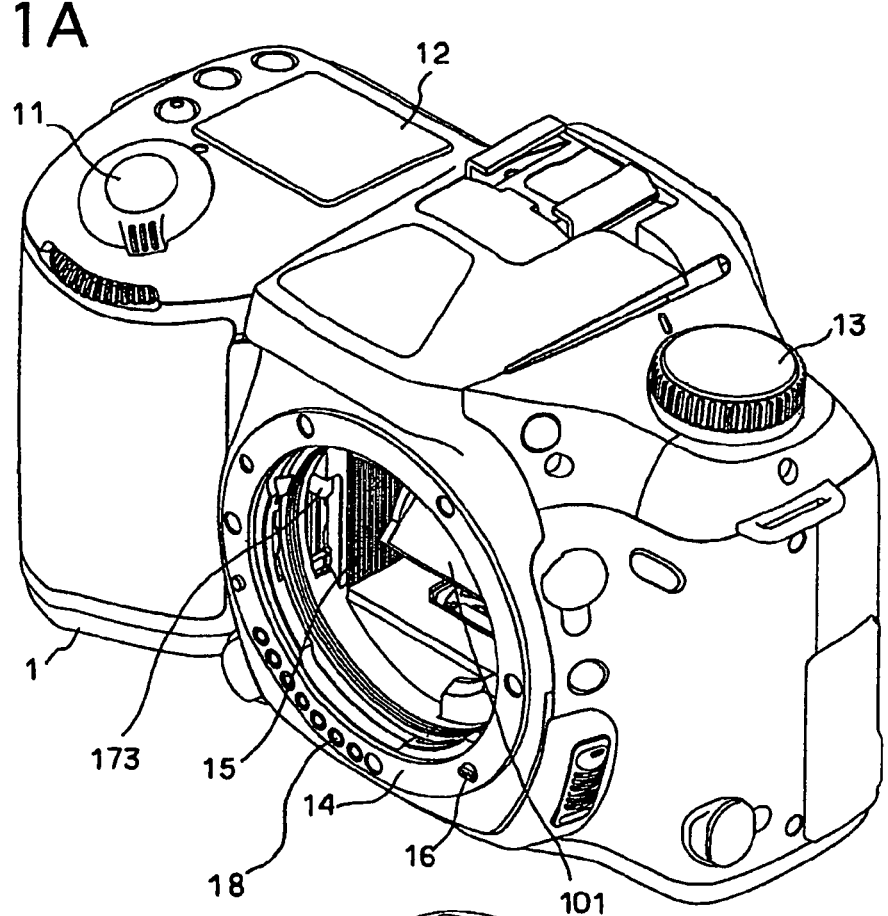
FIG. 1A is a front perspective view of a camera body of an embodiment of an SLR camera system according to the present invention.
Figure 1B:
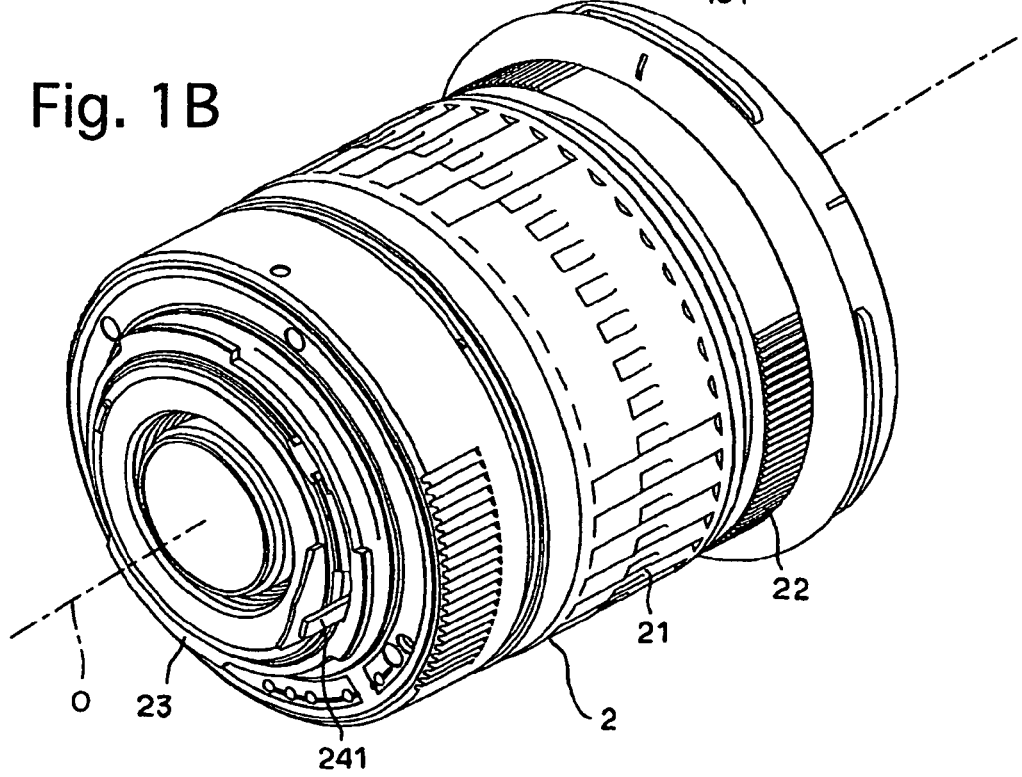
FIG. 1B is a rear perspective view of an interchangeable lens of the SLR camera system.

FIG. 1A is a front perspective view of a camera body 1 of an embodiment of an SLR digital camera system according to the present invention, and FIG. 1B is a rear perspective view of an interchangeable lens 2 of the SLR camera system which includes a diaphragm control bar 241. As shown in FIG. 1A, the camera body 1 is provided with a release button (photometering switch/release switch) 11, an LCD indicator 12 and a mode select dial 13. The camera body 1 is provided on the front thereof with a lens mount 14 to which the interchangeable lens 2 is detachably attached. The camera body 1 is provided therein with a mirror box 15 which is exposed at the lens mount 14, and is provided in the mirror box 15 with a main mirror (quick-return mirror) 101 and a diaphragm-driving slide plate 173 which is slidingly moved upwards with respect to FIG. 1A upon the main mirror 101 rising. The camera body 1 is provided on part of the lens mount 14 with an AF coupler 16 for performing an AF control of the interchangeable lens 2, and is further provided on another part of the lens mount 14 with a series of terminal contacts 18 for establishing electrical connections with the interchangeable lens 2 mounted to the camera body 1. The interchangeable lens 2 is provided along the outer periphery thereof with a zoom ring 21 and a focus ring 22, each of which can be manually operated and are coaxially arranged side by side in the axial direction of the interchangeable lens 2. The interchangeable lens 2 is provided at the rear end thereof with a bayonet mount 23 which is brought into engagement with the lens mount 14 of the camera body 1 to attach the interchangeable lens 2 to the camera body 1. The interchangeable lens 2 is provided, in association with the bayonet mount 23, with the aforementioned diaphragm control bar 241, the rear end of which projects rearward from the bayonet mount 23 as shown in FIG. 1B. The diaphragm control bar 241 is driven by the diaphragm-driving slide plate 173 of the camera body 1 to drive a diaphragm mechanism 24 provided in the interchangeable lens 2. The diaphragm control bar 241 engages with the diaphragm-driving slide plate 173 when the interchangeable lens 2 is mounted to the camera body 1.

Figure 2A:
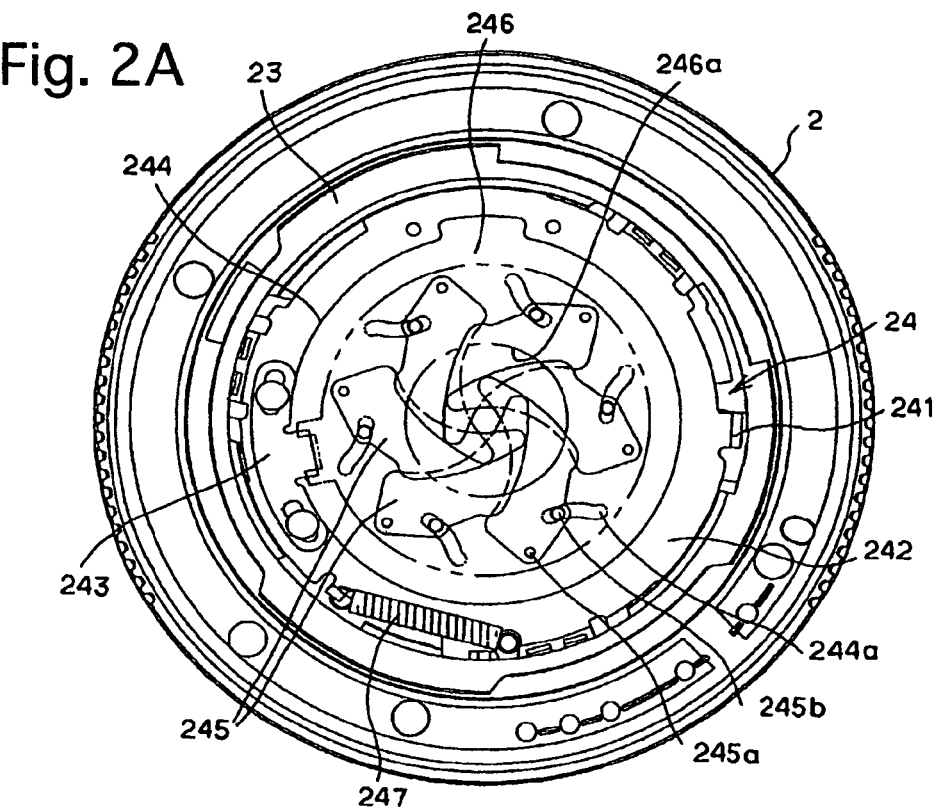
FIG. 2A is a rear elevational view of the interchangeable lens of FIG. 1B with parts thereof removed for clarity, showing the iris diaphragm, the diaphragm drive mechanism and associated elements provided in the interchangeable lens in a full stop-down state.
Figure 2B:
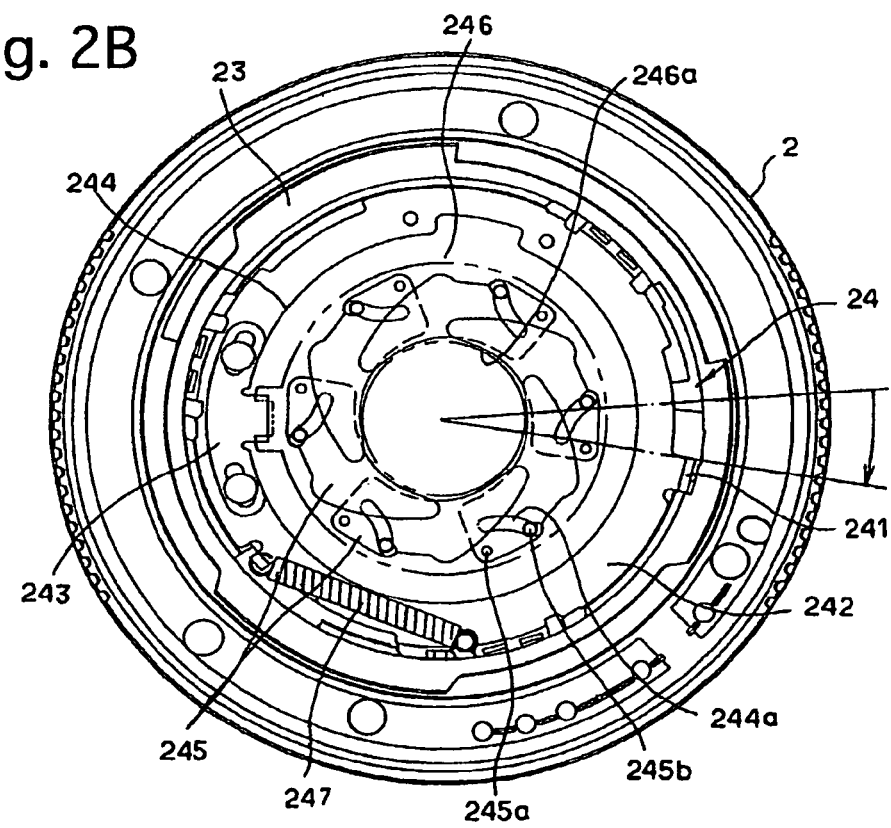
FIG. 2B is a view corresponding to that of FIG. 2A, showing the iris diaphragm, the diaphragm drive mechanism and the associated elements of the interchangeable lens in a maximum aperture-size state.

FIG. 2A is a rear elevational view of the interchangeable lens 2 with some parts thereof being removed for clarity, viewed from the rear of the interchangeable lens 2 in the optical axis direction (the direction of an optical axis O shown in FIG. 1B). FIG. 3 is a perspective view of a diaphragm drive mechanism 17 of the camera body 1 which is configured to drive the diaphragm-driving slide plate 173 that is provided in the camera body 1, viewed obliquely from slightly below and the front left of the camera body 1. The structure of the diaphragm mechanism 24 is the same as that adopted in conventional interchangeable lenses. The diaphragm mechanism 24 is provided with a diaphragm ring (drive ring) 242, a ring cam 244 and a plurality of diaphragm blades 245. The diaphragm control bar 241 is formed integral with the outer edge of the diaphragm ring 242 to project rearward in the optical axis direction, so that the diaphragm ring 242 rotates with the diaphragm control bar 241 about the optical axis O. The ring cam 244 is coupled to the diaphragm ring 242 via an engaging plate 243, as shown in FIGS. 2A and 2B, so as to rotate integrally with the diaphragm ring 242 when the diaphragm ring 242 is rotated. Each of the plurality of diaphragm blades 245 swings by rotation of the ring cam 244 so as to change the diameter of a central aperture formed by the plurality of diaphragm blades 245. Each diaphragm blade 245 is provided with a pivot 245a and is pivoted on a diaphragm stationary ring 246 via the pivot 245a to be capable of rotating about the pivot 245a in a plane in which the diaphragm blade 245 lies. The diaphragm stationary ring 246 is provided at a center thereof with a circular optical-axis aperture 246a. Each diaphragm blade 245 is provided on another portion thereof with a cam follower 245b in the form of a pin which is engaged in a corresponding cam slot (curved slot) 244a formed in the ring cam 244. The diaphragm ring 242 is biased to rotate counterclockwise with respect to FIG. 2A by a control-bar restoring spring (in-lens spring device/extension coil spring) 247 which is extended and installed between a pin fixed to the diaphragm ring 242 and another pin fixed to a stationary portion of the interchangeable lens 2. The diameter of the optical-axis aperture 246a of the diaphragm stationary ring 246, which has the center thereof on the optical axis O, is predetermined to be substantially identical to the minimum F-number (full aperture/maximum aperture size) of the interchangeable lens 2.

In the diaphragm mechanism 24, when the interchangeable lens 2 is not mounted to the camera body 1, the diaphragm ring 242 has been fully rotated by the spring force of the control-bar restoring spring 247 and held at the fully rotated position in the counterclockwise direction with respect to FIG. 2A, while each diaphragm blade 245 has been fully rotated in the counterclockwise direction with respect to FIG. 2A about the associated pivot 245a via the engagement of the associated cam slot 244a of the ring cam 244 with the associated cam follower 245b to enter the optical-axis aperture 246a so that the plurality of diaphragm blades 245 collaborate to form a minimum aperture size, i.e., to set the maximum F-number of the interchangeable lens 2. In this state, rotating the diaphragm control bar 241 against the spring force of the control-bar restoring spring 247 by a required angle of rotation as shown by the arrow in FIG. 2B causes the diaphragm ring 242 to rotate clockwise against the spring force of the control-bar restoring spring 247, and the rotation of the diaphragm ring 242 to the fully clockwise rotated position causes each diaphragm blade 245 to rotate clockwise about the associated pin 245a via the engagement of the associated cam slot 244a of the ring cam 244 with the associated cam follower 245b so that each diaphragm blade 245 retracts to an outer periphery of the optical-axis aperture 246a of the diaphragm stationary ring 246 to thereby make the plurality of diaphragm blades 245 form a full-aperture with the minimum F-number (maximum aperture size). Namely, the F-number of the interchangeable lens 2 changes in response to changes in rotational position of the diaphragm control bar 241. Note that the spring force of the control-bar restoring spring 247 is predetermined according to the type of the interchangeable lens 2, and is not constant (uniform) for all the interchangeable lenses, because, for example, the force (i.e., torque) for making the diaphragm mechanism 24 perform a stop-down operation differs according to the diametric size of the diaphragm mechanism 24 that is determined according to the diametric size of the interchangeable lens 2.

Figure 5:
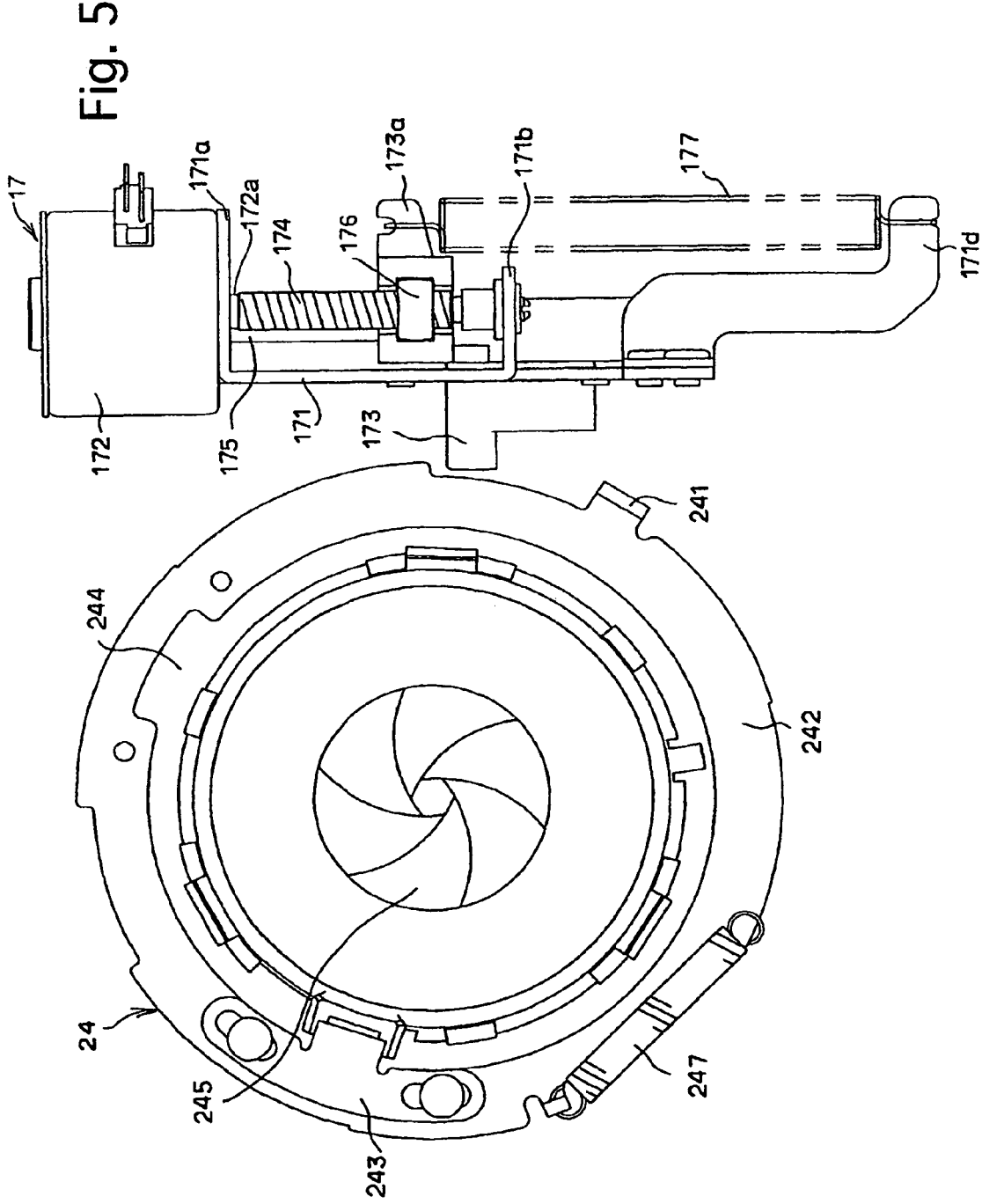
FIG. 5 is a rear elevational view of the diaphragm drive mechanism shown in FIG. 3A and the diaphragm mechanism shown in FIG. 3B in a state where the bayonet portion of the interchangeable lens is inserted into the lens mount of the camera body but has not yet been turned relative to the lens mount of the camera body to be locked therewith.

On the other hand, the diaphragm drive mechanism 17 that is provided in the camera body 1 is mounted to a frame 171 fixed to the mirror box 15 to be supported thereby. The diaphragm drive mechanism 17 is provided with a diaphragm drive motor (diaphragm-driving stepping motor) 172, which is a stepping motor and constitutes a drive source, and the diaphragm-driving slide plate 173 (shown in FIG. 1) that is slidingly moved up and down in the mirror box 15 by the diaphragm drive motor 172. FIG. 5 is a rear elevational view of the diaphragm drive mechanism 17 and the diaphragm mechanism 24, viewed from the back of these mechanisms shown in FIGS. 3A and 3B in the optical axis direction, showing a state immediately after the bayonet portion 23 of the interchangeable lens 2 is inserted into the lens mount 14 of the camera body 1 to attach the interchangeable lens 2 to the camera body 1 at the bayonet portion 23 and before the bayonet portion 23 is turned relative to the lens mount 14 to be locked therewith. In this state shown in FIG. 5, the diaphragm control bar 241 is not yet engaged with the diaphragm-driving slide plate 173. The diaphragm drive motor 172 is supported by an upper end lug 171a of the frame 171 with a rotary output shaft 172a of the diaphragm drive motor 172 directed downward. A rotatable lead screw 174 with a helical groove which is rotatably supported at the lower end thereof by a middle lug 171b of the frame 171 is coaxially fixed to the rotary output shaft 172a at the upper end of the rotatable lead screw 174 to be rotatable by the diaphragm drive motor 172. The frame 171 is provided below the middle lug 171b with a second lug 171c (see FIG. 3A), and is further provided between the upper end lug 171a and the second lug 171c with a guide bar 175 which extends vertically. The diaphragm-driving slide plate 173 is supported by the guide bar 175 to be slidable thereon in the vertical direction. A lead nut 176 which is screwed on the lead screw 174 is fixed to the diaphragm-driving slide plate 173, and a rotation of the lead screw 174 causes the lead nut 176 to move on the lead screw 174 in the axial direction thereof, thus causing the diaphragm-driving slide plate 173 that is integral with the lead nut 176 to move along the guide bar 175 in the vertical direction. Additionally, a diaphragm-driving slide plate restoring spring (in-body spring device/extension coil spring) 177 is extended between a notch formed in a lug 173a of the diaphragm-driving slide plate 173 and a notch formed in a lower end lug 171d of the frame 171 to bias the diaphragm-driving slide plate 173 downward.

The lead angle of the helical groove on the lead screw 174 (the angle of the helical groove relative to the axial direction, i.e., the amount of movement of the helical groove relative to the angle of rotation of the lead screw 174 in the axial direction) is predetermined to be an angle allowing the lead screw 174 to rotate integrally with the rotary output shaft 172a of the diaphragm drive motor 172 on the axis thereof when the lead nut 176 is forced to translate along the axis of the lead screw 174, namely, a relatively large angle which makes it possible to rotate the lead screw 174 about the axis thereof against the detent torque of the diaphragm drive motor (stepping motor) 172 (i.e., torque required to rotate the rotary output shaft 172a when the diaphragm drive motor 172 is not in operation). In other words, the diaphragm drive motor 172 can be rotated when the diaphragm-driving slide plate 173 is forcibly moved. In addition, the spring force of the diaphragm-driving slide plate restoring spring 177 is predetermined to be greater than the spring force of the control-bar restoring spring 247 that is provided as an element of the diaphragm mechanism 24 and to have a large spring force capable of pulling the diaphragm-driving slide plate 173 downward with respect to FIG. 5 against the aforementioned detent torque.

Figure 4:
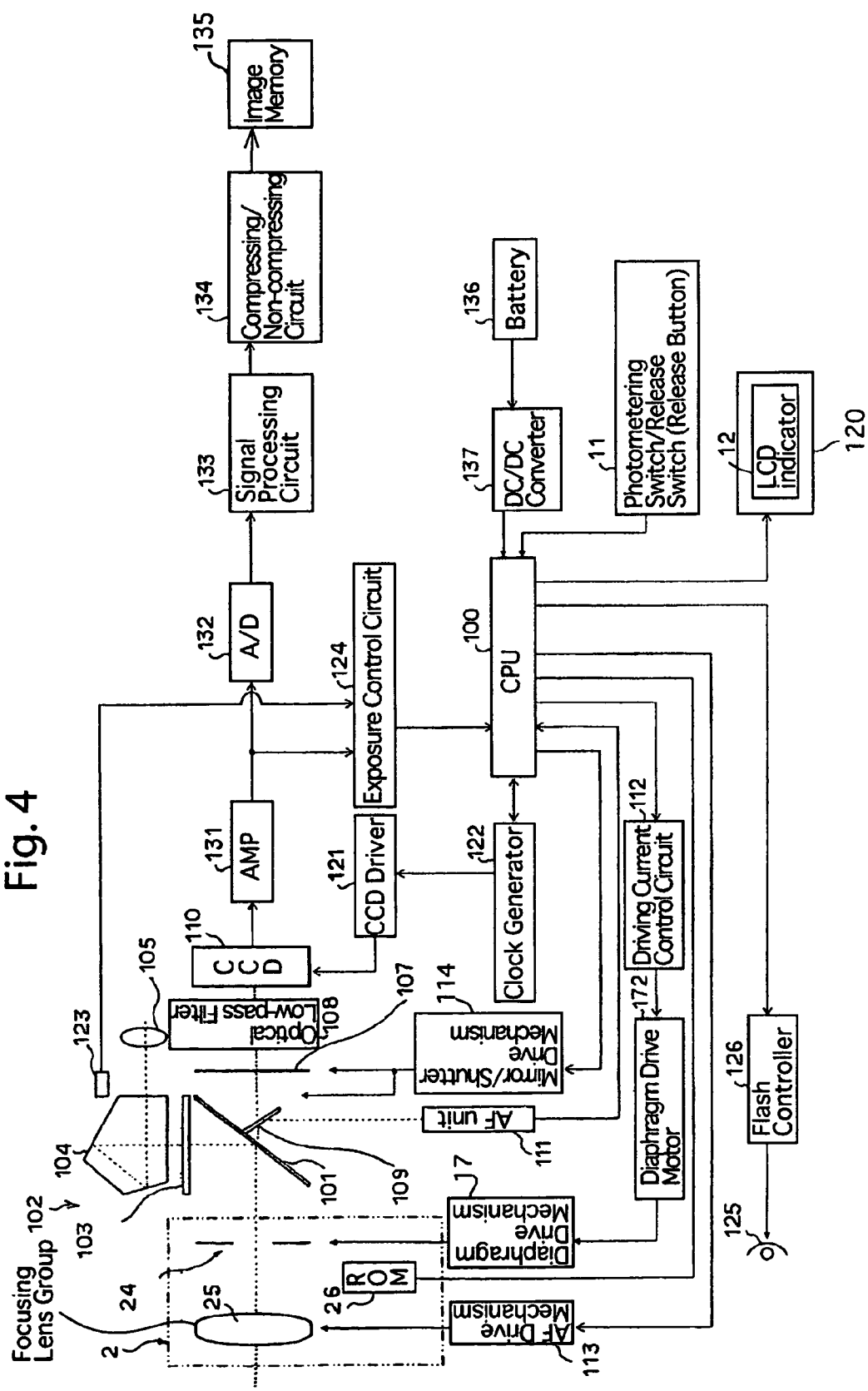
FIG. 4 is a schematic block diagram of the SLR camera system.

FIG. 4 is a schematic block diagram of the SLR camera system. As shown in FIG. 4, the interchangeable lens 2 is provided therein with a lens group (focusing lens group) 25 and the above described diaphragm mechanism 24, and is further provided with a lens ROM (memory) 26 in which various characteristic data on the interchangeable lens 2 is stored. In the lens ROM 26, data on the spring constant of the control-bar restoring spring 247 is stored as characteristic data related to the present embodiment and can be read out from the camera body 1. Although the details on the method of storing the spring constant and other characteristic details of the interchangeable lens 2 are well known in the art and hence are omitted from the following description, the value of the spring constant can be, for example, stored as data on the coded value of the spring constant. Namely, data on the spring constant of the control-bar restoring spring 247 stored in the lens ROM 26 only needs to be data from which the camera body 1 can recognize the spring constant of the control-bar restoring spring 247 of the interchangeable lens 2 by reading out this data from the lens ROM 26, as will be described below.

On the other hand, the camera body 1 is provided, in an internal space thereof above the main mirror 101, with an optical viewfinder 102 for viewing an object image formed through the interchangeable lens 2. The optical viewfinder 102 includes a focusing screen 103, a pentagonal roof prism 104, an eyepiece 105. The camera body 1 is further provided with a shutter 107, an optical low-pass filter 108 and an image pickup device (CCD) 110. The shutter 107 allows object light to pass through when opened with the main mirror 101 being lifted to the upper position (retracted position) upon a shutter release, the optical low-pass filter 108 is for optically processing the object image passed through the shutter 107, and the image pickup device 110 converts the object image formed thereon into an electrical signal to perform an image capturing operation. The camera body 1 is provided, immediately behind a half-mirror portion formed at a central portion of the main mirror 101, with a sub-mirror 109 which reflects the incident object light downward, and is further provided below the sub-mirror 109 with an AF unit 111 which receives the object light reflected by the sub-mirror 109 to measure a distance to the object. Additionally, to drive the diaphragm mechanism 24 of the interchangeable lens 2, the camera body 1 is provided with a driving current control circuit 112 for controlling a driving current which is supplied to the diaphragm drive motor 172 of the diaphragm drive mechanism 17 for driving the diaphragm-driving slide plate 173 (shown in FIG. 1). The camera body 1 is further provided with an AF drive mechanism 113 and a mirror/shutter drive mechanism 114. The AF drive mechanism 113 is for performing an AF control operation by driving the lens group 25, which is provided in the interchangeable lens 2, via the AF coupler 16, and the mirror/shutter drive mechanism 114 makes the main mirror 101 and the shutter 107 operate in association with each other.

Additionally, the camera body 1 is provided with a CCD driver 121, a clock generator 122, an AMP (amplifier circuit) 131, an A/D converting circuit 132, a signal processing circuit 133, a compressing/non-compressing circuit 134 and an image memory 135. The CCD driver 121 drives the image pickup device 121 to perform an image capturing operation. The clock generator 122 generates a drive signal for the CCD driver 121. The AMP 131, the A/D converting circuit 132, the signal processing circuit 133 and the compressing/non-compressing circuit 134 are used for processing the signal of the captured object image obtained by the image capturing operation performed by the image pickup device 121 and for compressing or not compressing this processed signal before writing this signal into the image memory 135. In addition, the camera body 1 is provided with an exposure control circuit 124 which outputs exposure data for exposure control on an object image captured by the image pickup device 110 in accordance with photometric data output from the photometering element 123 (provided in the optical viewfinder 102) and image data on an object image captured by the image pickup device 110. Exposure data output from the exposure control circuit 124 and AF data output from the AF unit 111 are input to a CPU (controller) 100 of the camera body 1. Based on these input data, the CPU 100 calculates appropriate F-number and in-focus position information. The CPU 100 controls the operations of the image pickup device 110, the mirror/shutter drive mechanism 114, etc.; however, in regard to control related to the present embodiment, the CPU 100 can control the driving current that is supplied to the diaphragm drive motor 172 by controlling the operation of the driving current control circuit 112, and on the other hand the CPU 100 can read out various data stored in the lens ROM 26 in the interchangeable lens 2, specifically, data on the spring constant of the control-bar restoring spring 247. The camera body 1 is provided with a DC/DC converter 137 via which the CPU 100 is supplied with power from a battery 136 serving as a power source of the CPU 100. The ON/OFF state of the release button 11, i.e., the ON/OFF states of a photometering switch and a release switch, are input to the CPU 100, while the CPU 100 can operate to make an external monitoring device 120 (which includes the LCD indicator 12 and a display monitor (not shown)) display various photographic data and captured images. The CPU 100 also controls the operation of a flash controller 126 for controlling the discharge of a flash 125 (see FIG. 4).

Figure 6:
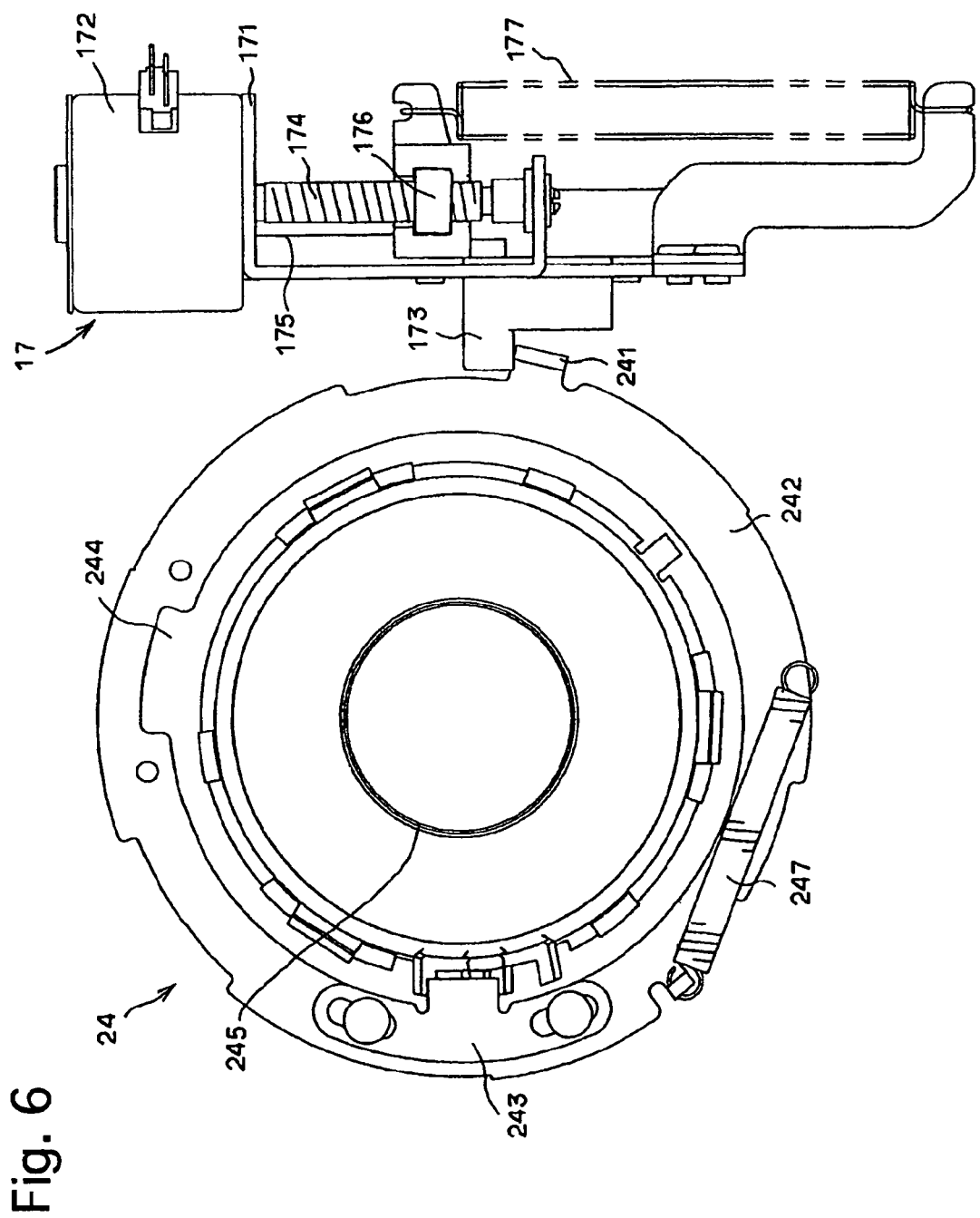
FIG. 6 is a view corresponding to that of FIG. 5, showing a maximum aperture-size state of the diaphragm after the interchangeable lens is properly mounted to the camera body.
Figure 7:
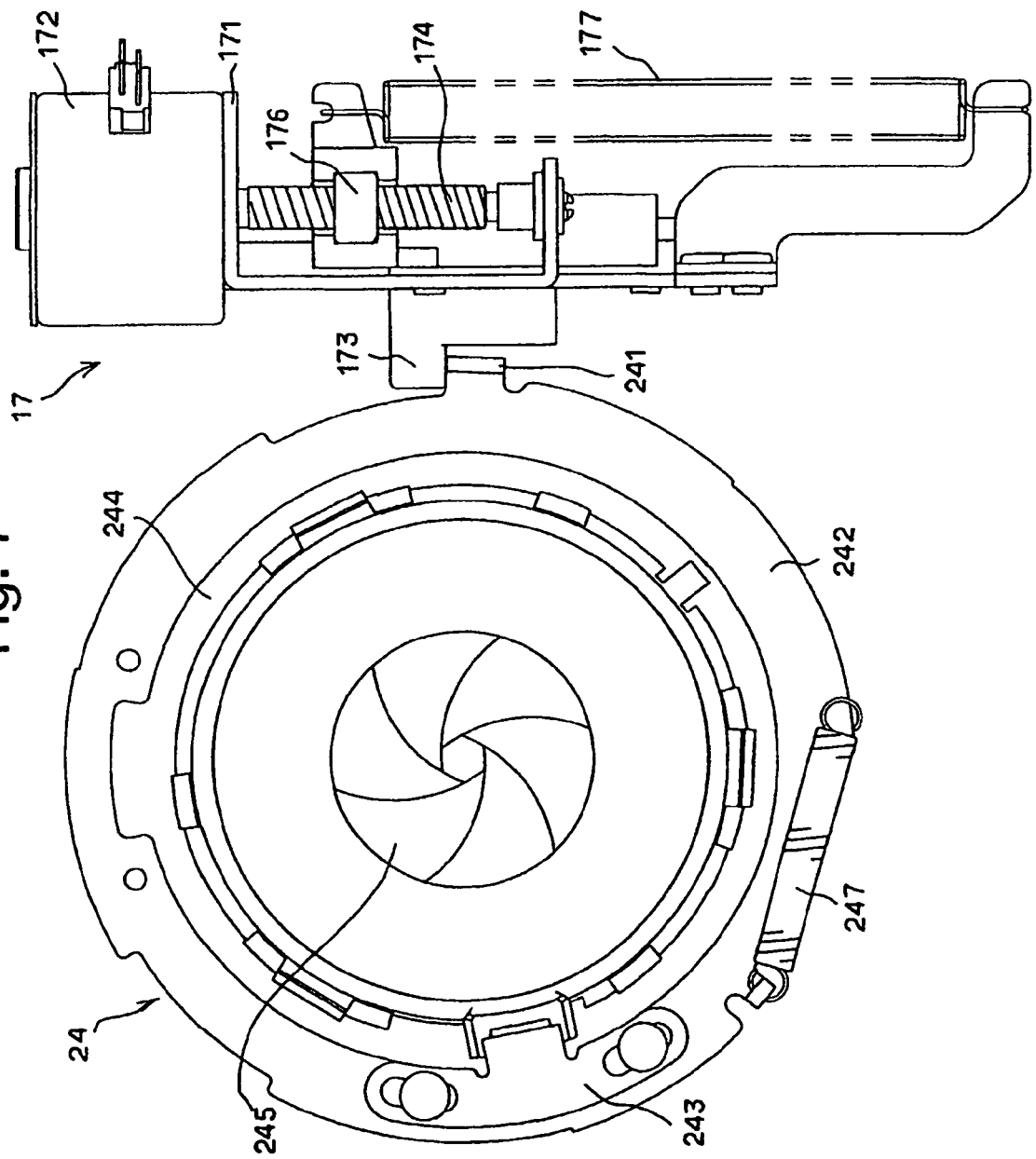
FIG. 7 is a view corresponding to that of FIG. 5, showing a state where the diaphragm is stopped down upon a shutter release, with the interchangeable lens mounted to the camera body.

Operations of the diaphragm mechanism 24 in association with the photographing operation of the present embodiment of the diaphragm driving device (configured by the diaphragm drive mechanism 17, the diaphragm drive motor 172, the diaphragm-driving slide plate restoring spring 177, the CPU 100 and driving current control circuit 112) that has the above described structure will be hereinafter discussed with reference to FIGS. 5 through 7. FIGS. 5 through 7 show rear elevational views of the diaphragm drive mechanism 17 and the diaphragm mechanism 24, viewed from the camera body 1 side, i.e., from the rear side of the interchangeable lens 2. Firstly, FIG. 5 shows a state immediately after the bayonet portion 23 is inserted into the lens mount 14 to attach the interchangeable lens 2 to the camera body 1 at the bayonet portion 23 as noted above. In this state, the diaphragm control bar 241 has not yet been engaged with the diaphragm-driving slide plate 173. Therefore, in the state shown in FIG. 5, the diaphragm control bar 241 is held in the initial position thereof at a lower position in the clockwise direction by the spring force of the control-bar restoring spring 247, the diaphragm mechanism 24 is in a state of a maximum F-number (minimum aperture size), and the diaphragm-driving slide plate 173 is held in a lower position which constitutes the initial position thereof by the spring force of the diaphragm-driving slide plate restoring spring 177.

In this state shown in FIG. 6, turning the interchangeable lens 2 counterclockwise by a small angle of rotation relative to the lens mount 14 to bring the bayonet portion 23 into engagement with the lens mount 14 causes the diaphragm control bar 241 to come into contact with the diaphragm-driving slide plate 173 from below with respect to FIG. 6, i.e., in the counterclockwise direction of the diaphragm ring 242. At this stage, since the spring force of the diaphragm-driving slide plate restoring spring 177 is greater than the spring force of the control-bar restoring spring 247 as noted above, the diaphragm-driving slide plate 173 is biased in a downward direction by the diaphragm-driving slide plate restoring spring 177 against the diaphragm control bar 241, and therefore the diaphragm ring 242 is prevented from rotating with the interchangeable lens 2 by the engagement of the diaphragm control bar 241 with the diaphragm-driving slide plate 173 which is held in the initial position thereof. Accordingly, the counterclockwise rotation of the interchangeable lens 2 relative to the lens mount 14 causes relative clockwise rotation of the diaphragm ring 242 from the initial position thereof relative to the interchangeable lens 2 while extending the control-bar restoring spring 247. Thereafter, when the diaphragm ring 242 reaches the rotational limit thereof, the interchangeable lens 2 and the camera body 1 are not yet completely locked, so that further turning the interchangeable lens 2 in the same counterclockwise direction relative to the lens mount 14 causes the diaphragm control bar 241 to move the diaphragm-driving slide plate 173 upward as shown in FIG. 6. Consequently, the interchangeable lens 2 and the camera body 1 are in a completely locked state (i.e., the interchangeable lens 2 is properly attached to the camera body 1) and the diaphragm mechanism is in a maximum aperture-size state (minimum F-number state) as shown in FIG. 2B.

After the interchangeable lens 2 is properly attached to the camera body 1 in the above described manner, depressing the release button 11 half way causes the photometering element 123 to perform a photometering operation and also causes the AF unit 111 to perform a distance measurement operation. Thereupon, the CPU 100 calculates a correct F-number from photometric data (object brightness information) obtained by the photometering operation and calculates a focal point from distance-measurement data obtained by the distance measurement operation. Information on the calculated correct F-number is input to the diaphragm drive mechanism 17. Similarly, information on the calculated focal point is input to the AF drive mechanism 113. Although the AF drive mechanism 113 operates to make the interchangeable lens 2 perform an AF operation based on this input information on the calculated focal point, the details of this AF operation are omitted from the following descriptions. Thereafter, upon the release button 11 being fully depressed, the CPU 100 outputs a drive signal and this drive signal is input to a mirror drive mechanism 114 (see FIG. 4) so that the main mirror 101 is driven to raise the main mirror 101 while the diaphragm drive motor 172 is concurrently driven by a driving current controlled by the driving current control circuit 112 to drive the diaphragm drive mechanism 17. This rotation of the diaphragm drive motor 172 causes the lead screw 174 to rotate on the axis thereof, and this rotation of the lead screw 174 causes the lead nut 176 and the diaphragm-driving slide plate 173 that is integral with the lead nut 176 to move upward (i.e., in a diaphragm stop-down direction) as viewed in FIG. 7 from the initial position thereof (the position shown in FIG. 6) against the biasing force of the diaphragm-driving slide plate restoring spring 177 as shown in FIG. 7. This upward movement of the diaphragm-driving slide plate 173 allows the diaphragm control bar 241 to move upward by the spring force of the control-bar restoring spring 247 with the diaphragm control bar 241 remaining in contact with the diaphragm-driving slide plate 173, thus allowing the diaphragm control bar 241 to rotate counterclockwise to thereby stop down the diaphragm mechanism 24. The stop-down amount of the diaphragm mechanism 24 depends on the amount of upward sliding movement of the diaphragm-driving slide plate 173 from the initial position shown in FIG. 6, i.e., the amount of counterclockwise rotation of the diaphragm control bar 241. When the diaphragm-driving slide plate 173 fully moves upward (in the diaphragm stop-down direction) to a maximum position, the amount of upward movement of the diaphragm control bar 241 also reaches a maximum position while the F-number of the diaphragm mechanism 24 becomes maximum (i.e., the aperture size of the diaphragm mechanism 24 becomes minimum) just as in the case shown in FIG. 2A.

Thereafter, the mirror/shutter drive mechanism 114 drives the shutter 107 so that it performs a shutter opening operation, an object image is formed on the image pickup device 110, and an image capturing operation is performed. Upon the shutter 107 shutting after the completion of the image capturing operation, the main mirror 101 moves down to the initial position thereof while the diaphragm drive motor 172 is driven to rotate in the reverse direction back to the initial rotational position thereof. Thereupon, the diaphragm-driving slide plate 173 moves down (i.e., in a diaphragm opening direction), back toward the initial position shown in FIG. 6, and this downward movement of the diaphragm-driving slide plate 173 causes the diaphragm control bar 241 to rotate in the clockwise direction in direct correlation with the downward movement of the diaphragm-driving slide plate 173. Subsequently, the diaphragm mechanism 24 is brought back to the maximum aperture-size state shown in FIG. 2B by the subsequent downward movement of the diaphragm-driving slide plate 173 to the initial position. At this time, if the driving current control circuit 112 stops outputting the driving current supplied to the diaphragm drive motor 172, the diaphragm drive motor 172 produces no torque so as to become freely rotatable by a torque greater than the detent torque of the diaphragm drive motor 172. Therefore, the diaphragm-driving slide plate 173 is moved down (in the diaphragm opening direction) to the initial position along the axis of the lead screw 174 by the spring force of the diaphragm-driving slide plate restoring spring 177 while forcibly rotating the lead screw 174. This downward movement of the diaphragm-driving slide plate 173 causes the diaphragm control bar 241 to rotate in the clockwise direction in direct correlation with the downward movement of the diaphragm-driving slide plate 173, and the diaphragm mechanism 24 is again brought back to the maximum aperture-size state shown in FIG. 2B. Even in the case where the F-number is changed in this manner, the one-to-one correlation between the step position of the diaphragm drive motor 172 and the F-number is maintained at all times since the diaphragm drive motor 172 rotates in direct correlation with variations in the F-number. Additionally, in a state where the diaphragm drive motor 172 stops at a predetermined rotational position thereof due to a drive signal input to the diaphragm drive mechanism 17, the torque of the diaphragm drive motor 172 is greater than the detent torque thereof, so that the diaphragm drive motor 172 is not forcibly rotated by an external force even if the diaphragm-driving slide plate 173 moves by the spring force of the diaphragm-driving slide plate restoring spring 177.

Since a stepping motor is used as the diaphragm drive motor 172 in the present embodiment, the driving current control circuit 112 controls the driving current that is supplied to the diaphragm drive motor 172 by controlling the frequency and duty ratio of a pulse signal supplied to the diaphragm drive motor 172 to control the torque of the diaphragm drive motor 172.

In this manner, the diaphragm drive mechanism 17 moves the diaphragm-driving slide plate 173 by a combination of the spring force of the control-bar restoring spring 247 and the torque of the diaphragm drive motor 172 (i.e., the spring force of the control-bar restoring spring 247 and the torque of said diaphragm drive motor 172 act on the diaphragm-driving slide plate 173 in a same direction) against the biasing force of the diaphragm-driving slide plate restoring spring 177, and accordingly, the torque to be produced by the diaphragm drive motor 172 is required to be increased if the spring force of the control-bar restoring spring 247 is small because the spring constant thereof is small. Conversely, the torque to be produced by the diaphragm drive motor 172 can be decreased if the spring force of the control-bar restoring spring 247 is great because the spring constant thereof is great. Accordingly, from the lens ROM 26 provided in the interchangeable lens 2 currently mounted to the camera body 1, the CPU 100 reads out data on the spring constant of the control-bar restoring spring 247 that is stored in the lens ROM 26, and controls the driving current that is supplied to the diaphragm drive motor 172 at the driving current control circuit 112 based on the data on the spring constant of the control-bar restoring spring 247.

Figure 8:
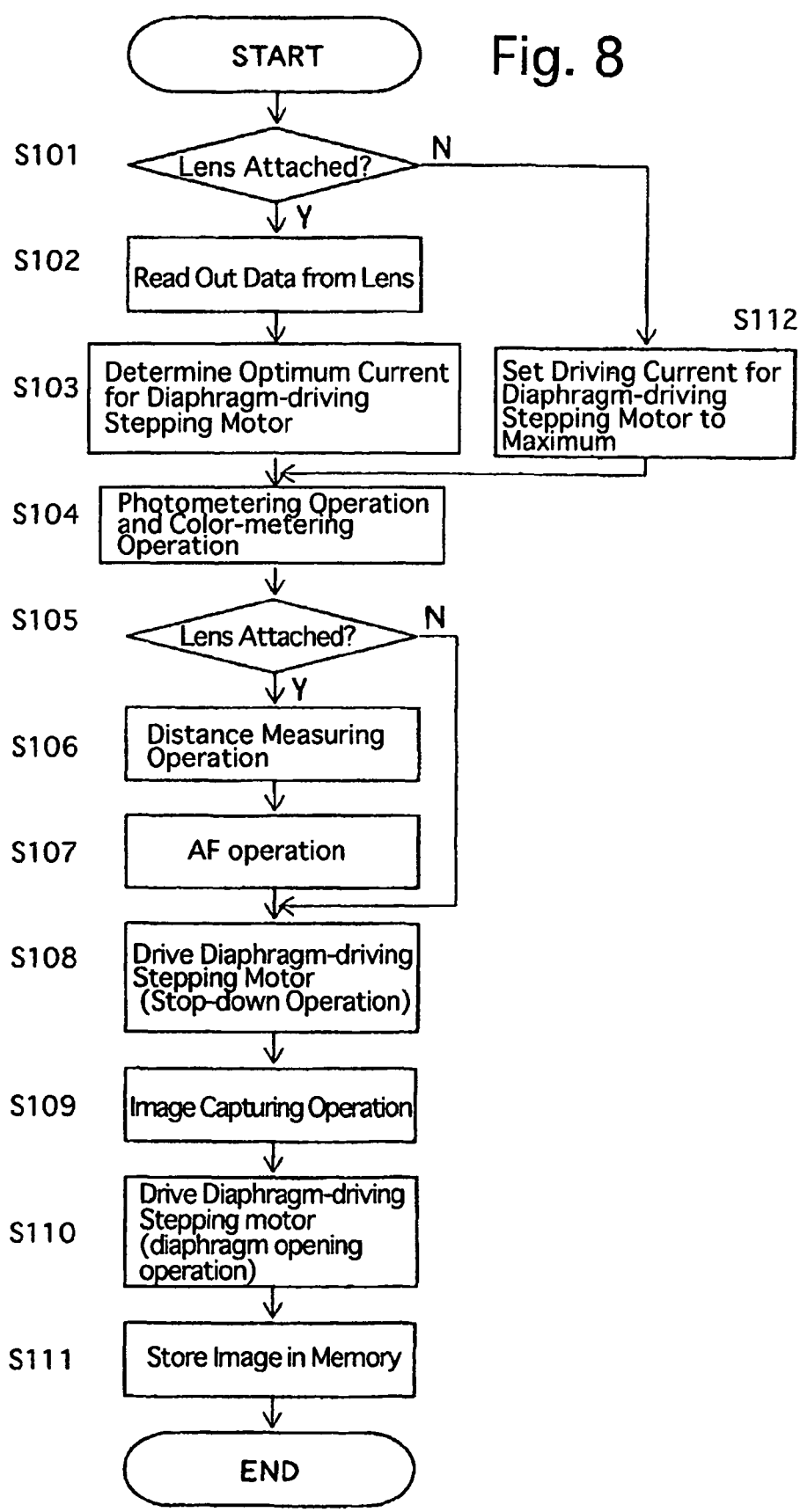
FIG. 8 is a flow chart illustrating an embodiment of operations for controlling a driving current which is supplied to a diaphragm drive motor.

FIG. 8 is a flow chart for illustrating an embodiment of operations for controlling the driving current that is supplied to the diaphragm drive motor 172. Firstly, it is determined whether or not the interchangeable lens 2 is currently mounted on the lens mount 14 (step S101). Upon the CPU 100 determining that the interchangeable lens 2 is currently mounted on the lens mount 14 (shown in FIG. 1) via establishment of electrical connections of the series of terminal contacts 18 with the interchangeable lens 2 (if YES at step S101), the CPU 100 accesses the lens ROM 26 of the interchangeable lens 2 and reads out data on the spring constant of the control-bar restoring spring 247 (step S102). Subsequently, based on this data on the spring constant, the CPU 100 controls the operation of the driving current control circuit 112 to determine an optimum driving current which is supplied to the diaphragm drive motor 172 (step S103). At this stage, for instance, the CPU 100 controls the driving current with reference to a correlation data table previously stored in the lens ROM 26 which indicates correlation between the spring constant and the driving current. This correlation data table is predetermined by previously measuring the spring constants of various types of control-bar restoring springs 247 and corresponding minimum current values with which the diaphragm-driving slide plate 173 can be actuated, respectively. Thereafter, a photometering operation and a color metering operation are performed at the exposure control circuit 124 (step S104), and it is determined whether or not the interchangeable lens 2 is currently mounted on the lens mount 14 (step S105). Thereafter, an object distance is measured using the AF unit 111 (step S106) and the lens group 25 is driven by the AF drive mechanism 113 to perform an AF operation (step S107). Thereafter, the diaphragm drive motor 172 is driven with the driving current determined at step S103 to move the diaphragm-driving slide plate 173, and this movement of the diaphragm-driving slide plate 173 causes the diaphragm mechanism 24 to perform a stop-down operation (step S108). Subsequently, the mirror/shutter drive mechanism 114 is driven to perform an image capturing operation (step S109), and thereupon, the diaphragm drive motor 172 is driven reversely to return the diaphragm mechanism 24 to a full-aperture state (diaphragm opening operation) (step S110). Thereafter, data on the captured image is processed and stored in the image memory 135 (step S111), and control ends. At step S101, if it is determined that the interchangeable lens 2 is not currently mounted on the lens mount 14, the camera body 1 is in a power-ON state without the interchangeable lens 2 being mounted to the camera body 1, so that the spring force of the control-bar restoring spring 247 is not at all exerted on the diaphragm-driving slide plate 173, and accordingly, the driving current which is supplied to the diaphragm drive motor 172 is set to the maximum to ensure the shutter release operation with no lens attached to the camera body 1 (step S112). As can be understood from the flow chart shown in FIG. 8, the driving current for the diaphragm drive motor 172 is controlled to increase when the spring constant of the control-bar restoring spring 247 is small. However, the driving current is controlled to decrease as the spring constant of the control-bar restoring spring 247 is great, which makes it possible to achieve a reduction in power consumption of the diaphragm drive motor 172.

Figure 9:
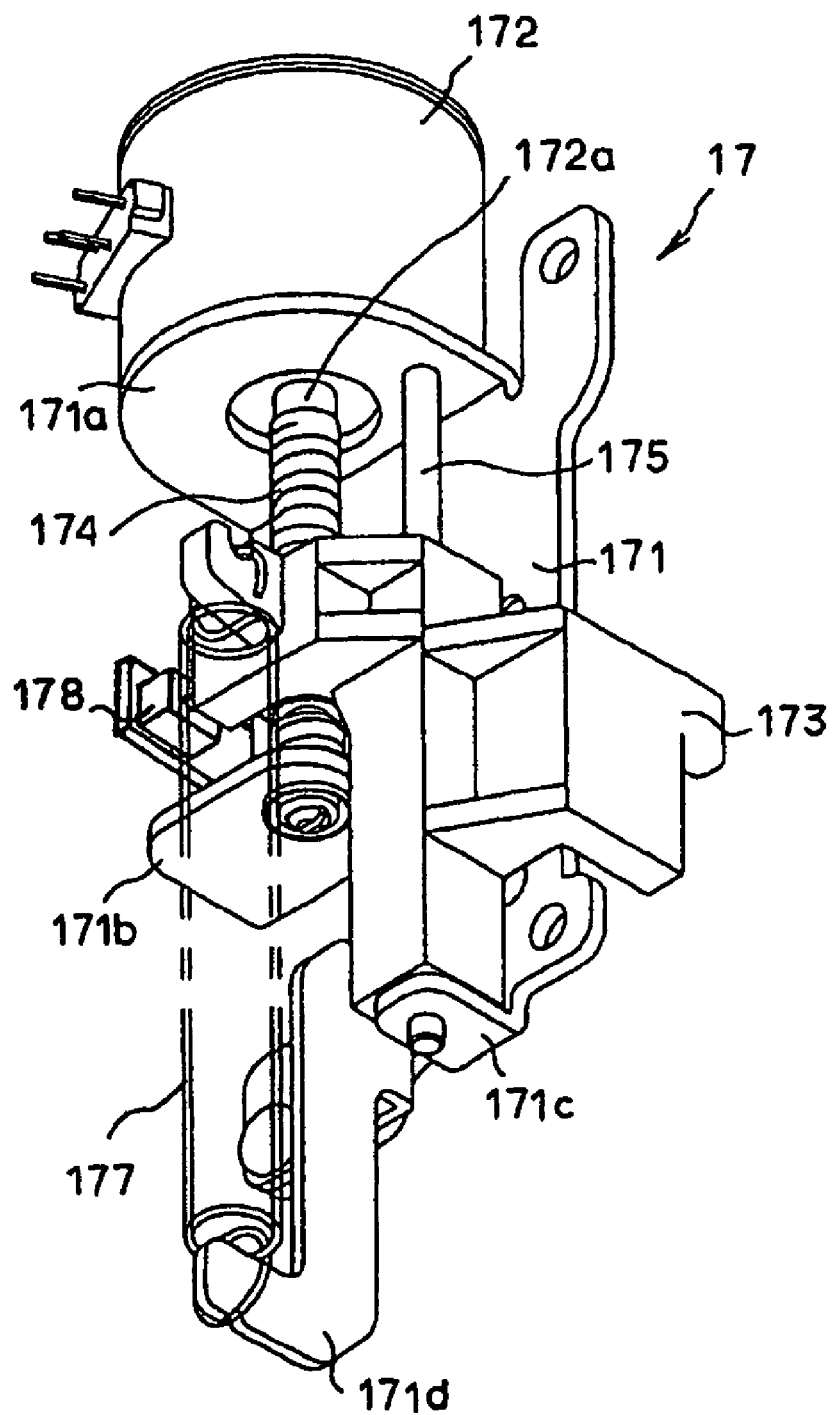
FIG. 9 is a perspective view of a modified embodiment of the diaphragm drive mechanism.

The present invention can also be applied to an interchangeable lens with no lens ROM, and also to an interchangeable lens with a lens ROM in which data on the spring constant of the control-bar restoring spring 247 is not stored. To this end, as shown in FIG. 9, a modified embodiment of the diaphragm drive mechanism 17 is provided on a portion of the frame 171 with a photo-reflector (rotation sensor) 178 for detecting the amount of movement of the diaphragm-driving slide plate 173. For instance, although not shown in the drawing, a plurality of line graduations or markings like a group of printed bars of a bar code can be formed on a side of a part of the diaphragm-driving slide plate 173. In this case, the camera system is configured so that the amount of movement of the diaphragm-driving slide plate 173 is detected by optically reading the plurality of line graduations or markings via the photo-reflector 178 and so that the diaphragm drive mechanism 17 performs an operation for making the diaphragm mechanism 24 perform a stop-down operation based on the detected amount of movement of the diaphragm-driving slide plate 173.

Figure 10:
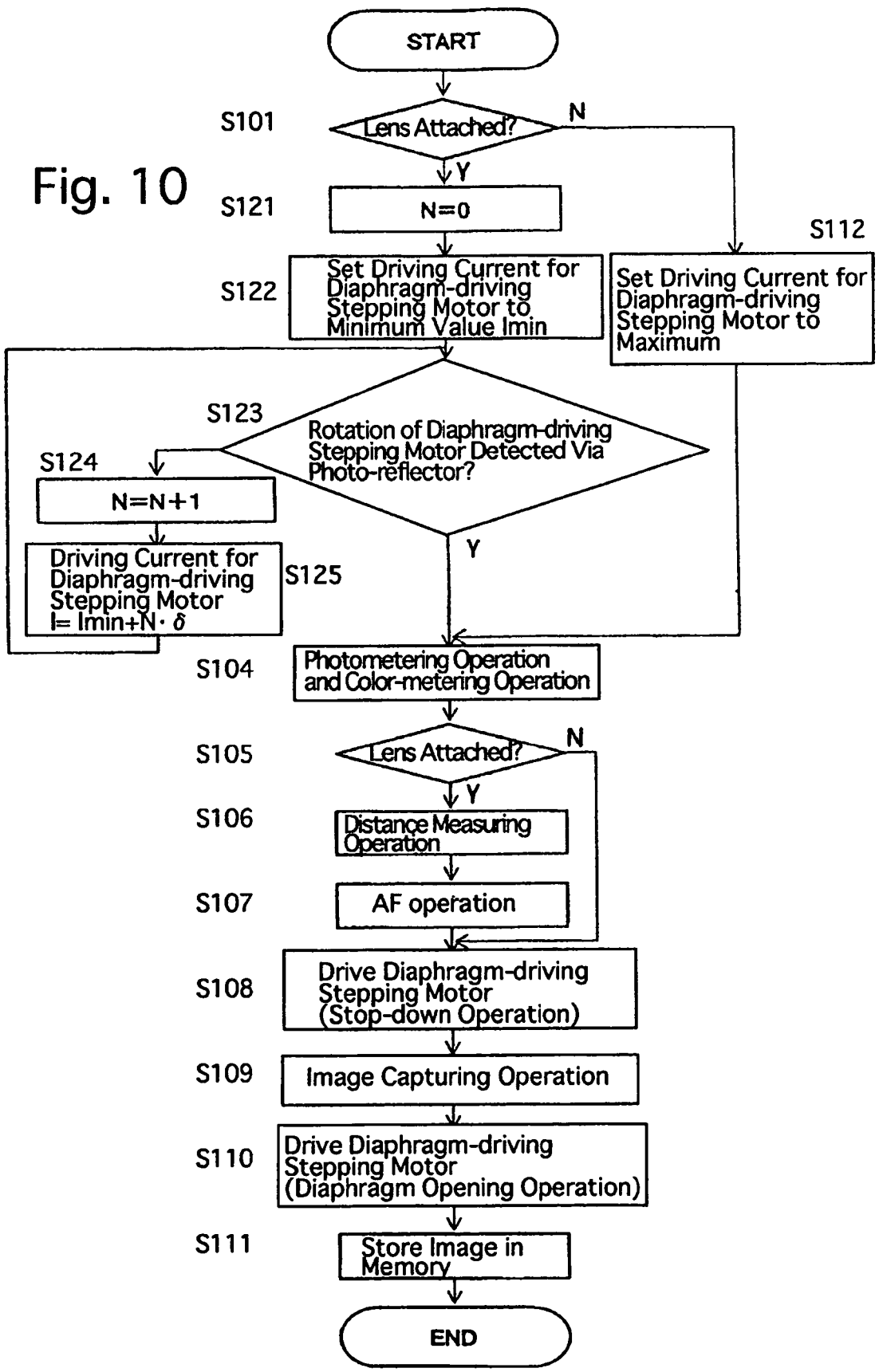
FIG. 10 is a flow chart illustrating another embodiment of operations for controlling the driving current that is supplied to a diaphragm drive motor in the case shown in FIG. 9.

FIG. 10 is a flow chart for illustrating an embodiment of operations for controlling the driving current in the case shown in FIG. 9. In this flow chart, operations similar to those shown in FIG. 8 are designated by the same step numbers, and the descriptions of these similar operations will be omitted below. In this embodiment, upon the CPU 100 determining that the interchangeable lens 2 is currently mounted on the lens mount 14 (if YES at step S101), a built-in counter (not shown; the description thereof is omitted) is reset to zero (N=0) (step S121) and the driving current for the diaphragm drive motor 172 is set to a minimum value Imin (step S122). Subsequently, it is determined via the photo-reflector 178 whether or not the diaphragm drive mechanism 17 is currently in operation, i.e., whether or not the diaphragm drive motor 172 is rotating (step S123). If it is determined that the diaphragm drive motor 172 is rotating (if YES at step S123), control proceeds to step S104 on the assumption that the a sufficient level of driving current has currently been supplied to the diaphragm drive motor 172, so that the operations at steps S104 through S111 that are similar to those in the flow chart shown in FIG. 8 are performed. At step S123, if it is determined via the photo-reflector 178 that the diaphragm drive mechanism 17 is not rotating (if NO at step S123), the built-in counter is incremented by one (N=N+1) (step S124) and the driving current for the diaphragm drive motor 172 is increased to Imin+N·δ (step S125), wherein δ represents the value of a predetermined minute electric current. Subsequently, control returns to step S123 to determine whether or not the diaphragm drive motor 172 is rotating, and thereafter the operations at steps S124 and S125 are repeated until it is determined at step S123 that the diaphragm drive motor 172 is rotating. This makes it possible to control the level of the driving current to a level at which the diaphragm drive motor 172 has just commenced rotating, i.e., to control the driving current to a minimum. As can be understood from the flow chart shown in FIG. 10, the driving current for the diaphragm drive motor 172 is controlled to increase when the spring constant of the control-bar restoring spring 247 is small, and the driving current is controlled to decrease as the spring constant of the control-bar restoring spring 247 is great, which makes it possible to achieve a reduction in power consumption of the diaphragm drive motor 172.

The present invention is not limited to the particular structure described in each of the above described embodiments. The present invention can be applied to a camera system in which the interchangeable lens is provided with a control-bar restoring spring (which corresponds to the control-bar restoring spring 247), in which the camera body is provided with a diaphragm drive motor (which corresponds to the diaphragm drive motor 172), and in which the diaphragm mechanism of the interchangeable lens performs a stop-down operation using both the torque of the diaphragm drive motor and the spring force of control-bar restoring spring 247. In addition, the present invention can be applied to not only a digital camera such as the above described embodiment of the digital camera but also a camera using light-sensitive film.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A diaphragm driving device for a camera comprising a camera body and an interchangeable lens which is detachably attached to said camera body, wherein said interchangeable lens comprises a diaphragm mechanism having an in-lens spring device for performing a stop-down operation, said in-lens-spring device having a spring constant, wherein said camera body comprises:

a diaphragm drive mechanism having a diaphragm drive motor and an in-body spring device, both of which are for making said diaphragm mechanism of said interchangeable lens perform said stop-down operation; and a controller for controlling a driving current which is supplied to said diaphragm drive motor in accordance with said spring constant of said in-lens spring device, wherein said interchangeable lens comprises a memory in which data on said spring constant of said in-lens spring device is stored, and wherein said controller reads said data on said spring constant of said in-lens spring device from said memory to control said driving current.

2. The diaphragm driving device according to claim 1, wherein, when performing one of said stop-down operation and a diaphragm opening operation, a spring force of said in-lens spring device and a torque of said diaphragm drive motor act on said diaphragm drive mechanism in a same direction while a spring force of said in-body spring device acts on said diaphragm drive mechanism in a direction opposite to said same direction.

3. The diaphragm driving device according to claim 2, wherein said same direction comprises a stop-down direction, said in-lens spring device and said diaphragm drive motor operating in said stop-down direction to make said diaphragm mechanism of said interchangeable lens perform said stop-down operation, while said in-body spring device operates in a direction opposite to said stop-down direction.

4. The diaphragm driving device according to claim 2, wherein said controller controls said driving current to increase said driving current when said spring constant of said in-lens spring device is small.

5. The diaphragm driving device according to claim 3, wherein said diaphragm mechanism of said interchangeable lens comprises a diaphragm control bar for changing an aperture size by a movement of said diaphragm control bar,
wherein said diaphragm driving device provided in said camera body comprises a diaphragm-driving slide plate which engages with said diaphragm control bar when said interchangeable lens is attached to said camera body,
wherein said in-lens spring device comprises a control-bar restoring spring which moves said diaphragm control bar in said stop-down direction to make said diaphragm mechanism of said interchangeable lens perform said stop-down operation,
wherein said diaphragm drive motor drives said diaphragm-driving slide plate in said stop-down direction so as to move said diaphragm control bar in said stop-down direction thereof, and
wherein said in-body spring device comprises a diaphragm-driving slide plate restoring spring which biases said diaphragm-driving slide plate in a direction to increase said aperture size to a maximum.

6. The diaphragm driving device according to claim 1, wherein said diaphragm driving device comprises a rotation sensor for sensing rotation of said diaphragm drive motor when stop-down operation is performed, and
wherein said controller increments a level of said driving current from a minimum level based on an output from said rotation sensor until said level of said driving current reaches a level enabling said diaphragm drive motor to rotate.

7. The diaphragm driving device according to claim 1, wherein said diaphragm drive motor comprises a stepping motor, and
wherein said controller controls said frequency and duty ratio of a pulse signal supplied to said diaphragm drive motor.

8. The diaphragm driving device according to claim 5, further comprising a diaphragm ring positioned coaxially around an optical axis of said interchangeable lens to be rotatable about said optical axis, said diaphragm control bar being integrally formed with said diaphragm ring.

9. The diaphragm driving device according to claim 5, wherein a spring force of said in-body spring device is greater than a spring force of said in-lens spring device so that said in-body spring device can move said diaphragm-driving slide plate against a detent torque of said diaphragm drive motor.

10. A diaphragm driving device provided in a camera body to which an interchangeable lens is detachably attached,
wherein said interchangeable lens comprises:
a diaphragm mechanism having a diaphragm control bar for changing an aperture size by a movement of said diaphragm control bar; and
a in-lens spring device for biasing said diaphragm control bar in a stop-down direction to make said diaphragm mechanism perform a stop-down operation, said in-lens spring device having a spring constant,
wherein said camera body comprises:
a diaphragm-driving slide plate which engages with said diaphragm control bar when said interchangeable lens is attached to said camera body;
a diaphragm drive motor for moving said diaphragm-driving slide plate in accordance with object brightness information of an object image formed through said interchangeable lens;
a in-body spring device for biasing said diaphragm-driving slide plate in a direction to increase said aperture size to a maximum; and
a controller for controlling a driving current which is supplied to said diaphragm drive motor in accordance with said spring constant of said in-lens spring device,
wherein said interchangeable lens comprises a memory in which data on said spring constant of said in-lens spring device is stored, and
wherein said controller reads said data on said spring constant of said in-lens spring device from said memory to control said driving current.

11. An interchangeable lens which is detachably attached to a camera body, comprising:
a diaphragm mechanism for changing an aperture size of said lens,
a in-lens spring device for biasing said diaphragm mechanism in a stop-down direction, said in-lens spring device having a spring constant, and
a memory which stores data on said spring constant of said in-lens spring device,
wherein said controller reads said data on said spring constant of said in-lens spring device from said memory to control said driving current.

* * * * *